US011507463B2

(12) United States Patent
McAdams et al.

(10) Patent No.: US 11,507,463 B2
(45) Date of Patent: Nov. 22, 2022

(54) SYSTEM AND METHOD FOR CONSOLIDATED BIOS-LEVEL EVENT LOGGING

(71) Applicant: Dell Products L.P., Round Rock, TX (US)

(72) Inventors: Carl Claude McAdams, Round Rock, TX (US); Joshua Nathaniel Alperin, Round Rock, TX (US); Ruhull Alam Bhuiyan, Austin, TX (US); Allen Chester Wynn, Round Rock, TX (US); Ibrahim Sayyed, Georgetown, TX (US); Greg Alan Havenga, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 605 days.

(21) Appl. No.: 16/519,612

(22) Filed: Jul. 23, 2019

(65) Prior Publication Data

US 2021/0026737 A1 Jan. 28, 2021

(51) Int. Cl.
*G06F 11/14* (2006.01)
*G06F 9/54* (2006.01)
*G06F 11/34* (2006.01)

(52) U.S. Cl.
CPC .......... *G06F 11/1417* (2013.01); *G06F 9/542* (2013.01); *G06F 11/3476* (2013.01)

(58) Field of Classification Search
CPC .. G06F 11/1417; G06F 11/3476; G06F 9/542; G06F 11/0787; G06F 11/0766; G06F 11/0769; G06F 11/0775; G06F 11/0781; G06F 11/0784; G06F 9/4411
See application file for complete search history.

(56) References Cited

U.S. PATENT DOCUMENTS

| 6,173,418 | B1* | 1/2001 | Fujino | G06F 11/3476 714/20 |
| 2002/0073353 | A1* | 6/2002 | Fish | G06F 9/4411 714/2 |
| 2003/0126516 | A1* | 7/2003 | Komarla | G06F 11/073 714/45 |

(Continued)

*Primary Examiner* — Phil K Nguyen
*Assistant Examiner* — Brian J Corcoran
(74) *Attorney, Agent, or Firm* — McDermott Will & Emery LLP (57) ABSTRACT

Methods, systems, and computer programs encoded on computer storage medium, for identifying, during a particular boot of an information handling system, basic input/output system (BIOS)-level events, each BIOS-level event associated with a different BIOS log event source; for each BIOS-level event: creating, by a respective driver computing module associated with the BIOS-level event, event data for the BIOS-level event; calling, by the respective driver computing module associated with the BIOS-level event, a dispatcher protocol to provide the event data associated with the respective driver computing module to a dispatcher computing module; placing, by the dispatcher computing module, each of the event data in a temporary data store, wherein each of the event data is unaltered; and creating, by the dispatcher computing module, a database log of the event data, including aggregating each of the event data to generate a sequence of events related to the particular boot of the IHS.

14 Claims, 6 Drawing Sheets

(56) References Cited

U.S. PATENT DOCUMENTS

2005/0060526 A1\* 3/2005 Rothman ............ G06F 11/0787
713/1
2012/0005542 A1\* 1/2012 Petersen ............... G06F 21/552
714/48

\* cited by examiner

SYSTEM AND METHOD FOR CONSOLIDATED BIOS-LEVEL EVENT LOGGING

BACKGROUND

Field of the Disclosure

The disclosure relates generally to information handling systems, and in particular, consolidated BIOS-level event logging of information handling systems.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Logging of BIOS-level events of information handling systems can be haphazard, and in some cases, non-existent. There is no "one-stop" solution for analyzing such BIOS-related problems or system misconfigurations. Conventional systems for logging of BIOS-level events are siloed and do not give a clear picture (e.g., data trail) of what has transpired during a boot of an information handling system with regard to events at the BIOS level—e.g., how the system got into the malfunctioning state and what could have been done to avoid this situation.

SUMMARY

Innovative aspects of the subject matter described in this specification may be embodied in a method including identifying, during a particular boot of an information handling system, a plurality of basic input/output system (BIOS)-level events, each BIOS-level event associated with a different BIOS log event source; for each BIOS-level event: creating, by a respective driver computing module associated with the BIOS-level event, event data for the BIOS-level event; calling, by the respective driver computing module associated with the BIOS-level event, a dispatcher protocol to provide the event data associated with the respective driver computing module to a dispatcher computing module; placing, by the dispatcher computing module, each of the event data in a temporary data store, including associating a timestamp with each event data, wherein each of the event data is unaltered; creating, by the dispatcher computing module, a database log of the event data, including aggregating each of the event data to generate a sequence of events related to the particular boot of the IHS; registering, by each event consumer computing module of a plurality of event consumer computing modules, with the dispatcher computing module; in response to the registering, receiving, by each event consumer computing module, each of the event data and the sequence of events included by the log; filtering, by each of the event consumer computing modules, the event data to identify a subset of event data that is applicable to the particular event consumer computing module; and processing, by each of the event consumer computing modules, the respective subset of event data.

Other embodiments of these aspects include corresponding system, apparatus, and computer programs, configured to perform the actions of the methods, encoded on computer storage devices.

These and other embodiments may each optionally include one or more of the following features. For instance, each respective driver computing module implements a respective macro and a library to identify event handling protocols for the respective BIOS-level event. Receiving, by each event consumer computing module each of the event data includes i) receiving all of the event data stored in the temporary data store and ii) receiving event data created for new BIOS-level events. Each of the event data includes the respective timestamp, a class of the BIOS-level event, and an event identification. Each of the event consumer computing modules filters the event data to identify the subset of events based on the class of the BIOS-level event. Storing, by each of the event consumer computing modules, the respective subset of event data that is applicable to the particular event consumer computing module in a permanent data store. The BIOS-level events can include a password change event, a boot order change event, a boot device change event, a secure boot change event, a BIOS mode change event, a battery event, a diagnostic event, and a hardware failure event.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document discusses a single, comprehensive solution for logging BIOS-level event data, and dissemination of such BIOS-level event data to event consumers/loggers. Specifically, this document provides a complete picture of many disparate sources within the BIOS of events that have happened over time at the BIOS/diagnostic level, including an temporal aspect to a series of events that can occur. Further, this event data can be aggregated from many systems with respect to the BIOS level to provide a single, comprehensive and coherent method of logging and consuming BIOS-level events.

Specifically, this document describes identifying, during a particular boot of an information handling system, a plurality of basic input/output system (BIOS)-level events, each BIOS-level event associated with a different BIOS log event source; for each BIOS-level event: creating, by a respective driver computing module associated with the BIOS-level event, event data for the BIOS-level event; calling, by the respective driver computing module associated with the BIOS-level event, a dispatcher protocol to provide the event data associated with the respective driver computing module to a dispatcher computing module; placing, by the dispatcher computing module, each of the event data in a temporary data store, including associating a timestamp with each event data, wherein each of the event data is unaltered; creating, by the dispatcher computing module, a database log of the event data, including aggregating each of the event data to generate a sequence of events related to the particular boot of the IHS; registering, by each event consumer computing module of a plurality of event consumer computing modules, with the dispatcher computing module; in response to the registering, receiving, by each event consumer computing module, each of the event data and the sequence of events included by the log; filtering, by each of the event consumer computing modules, the event data to identify a subset of event data that is applicable to the particular event consumer computing module; and processing, by each of the event consumer computing modules, the respective subset of event data.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
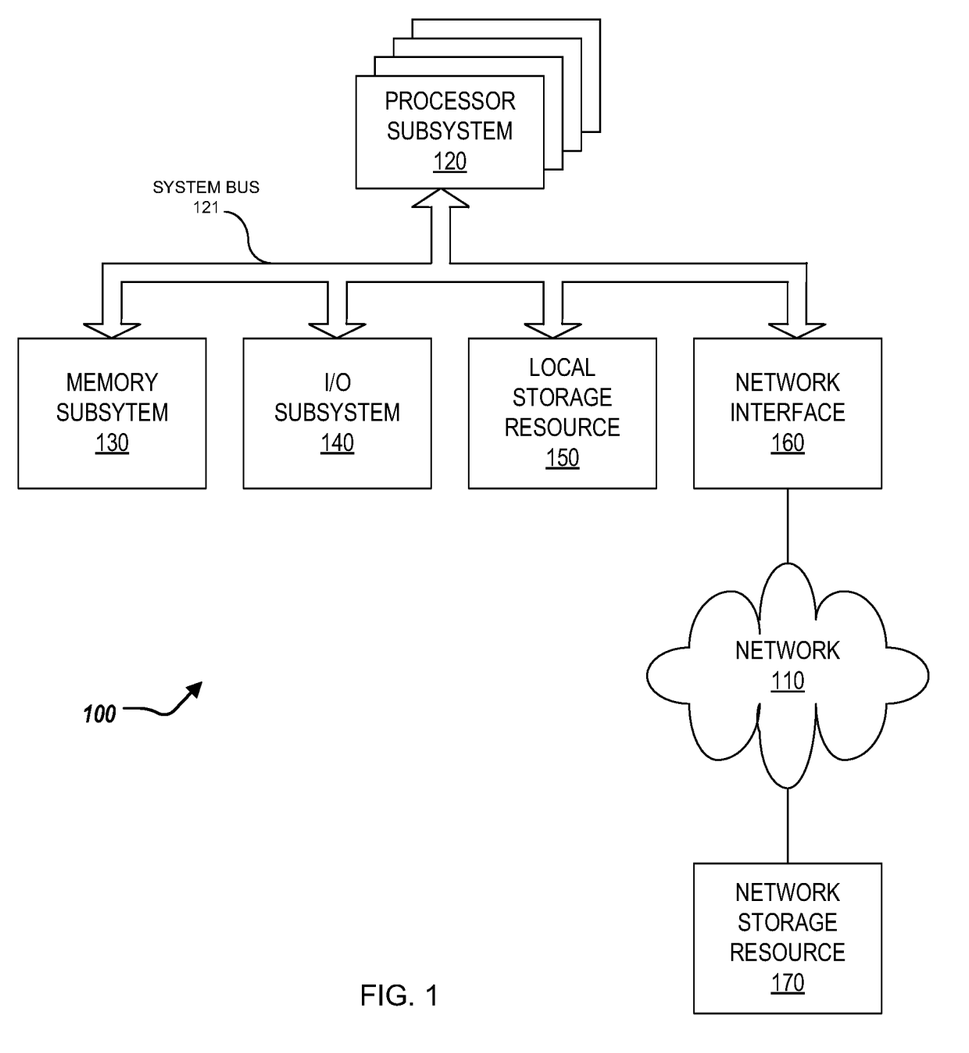
FIG. 1 is a block diagram of selected elements of an embodiment of an information handling system.
Figure 2A:
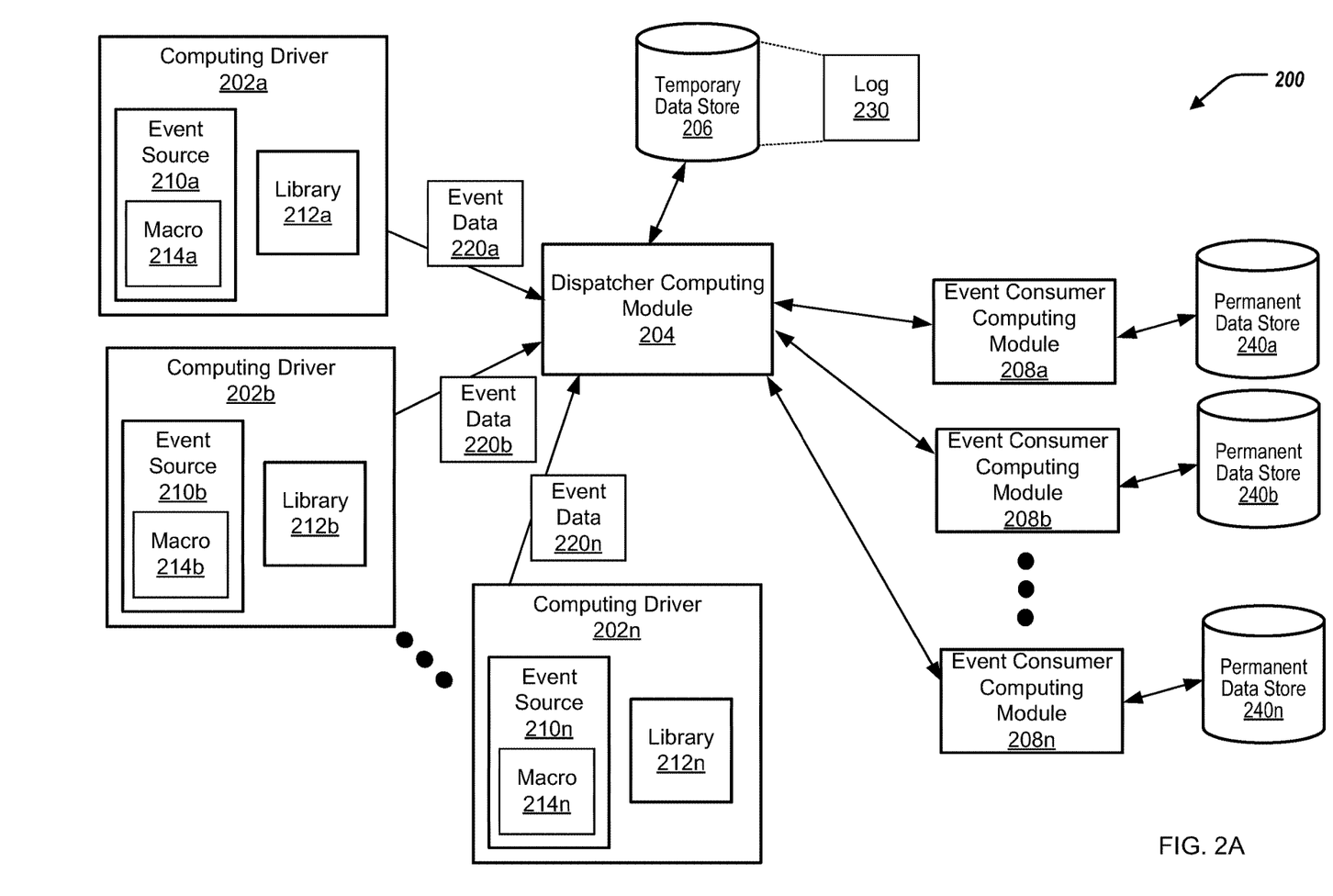
FIGS. 2A, 2B, 2C, 2D are block diagrams of an information handling system for consolidated BIOS-level event logging.
Figure 2B:
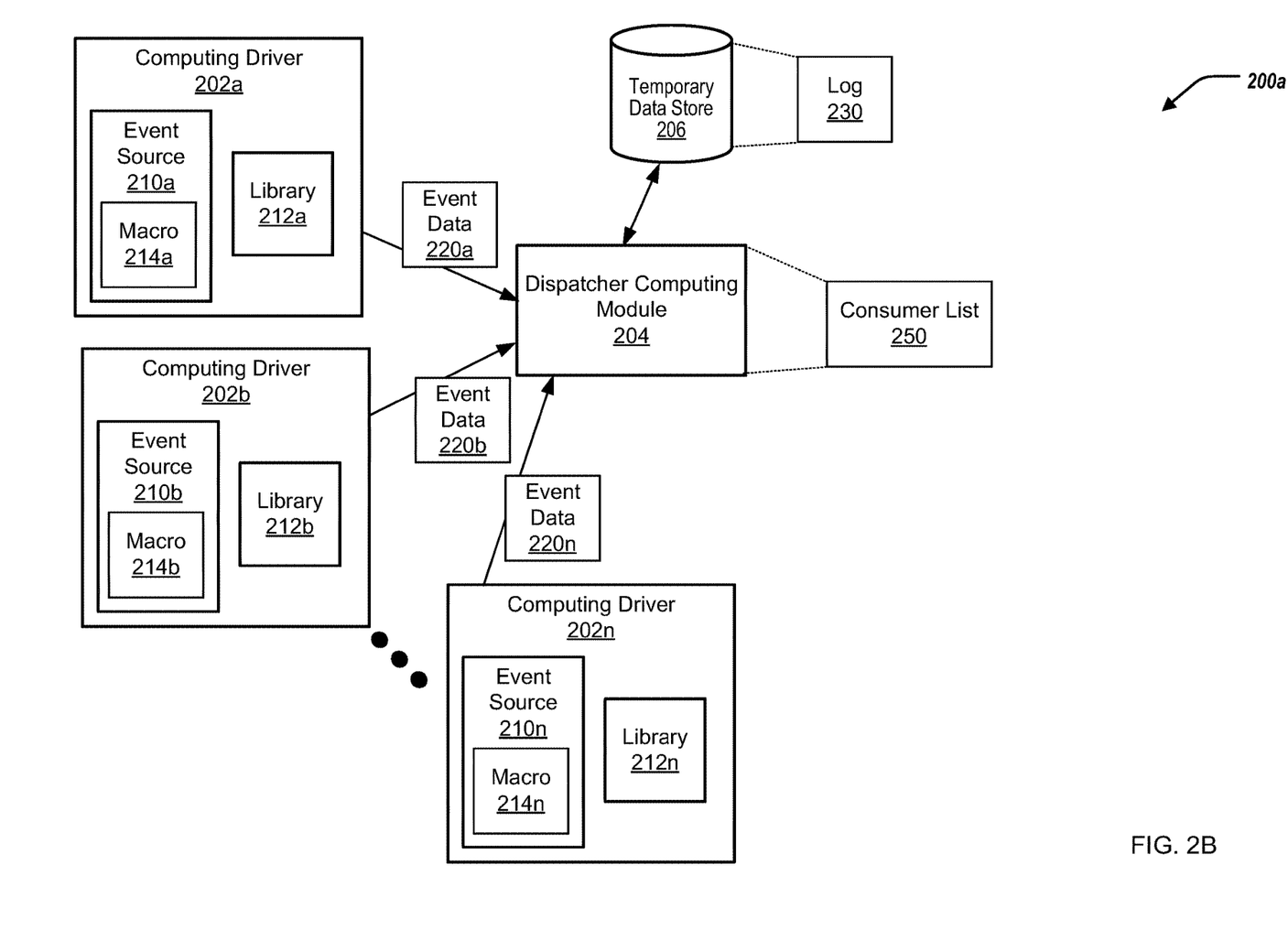
Figure 2C:
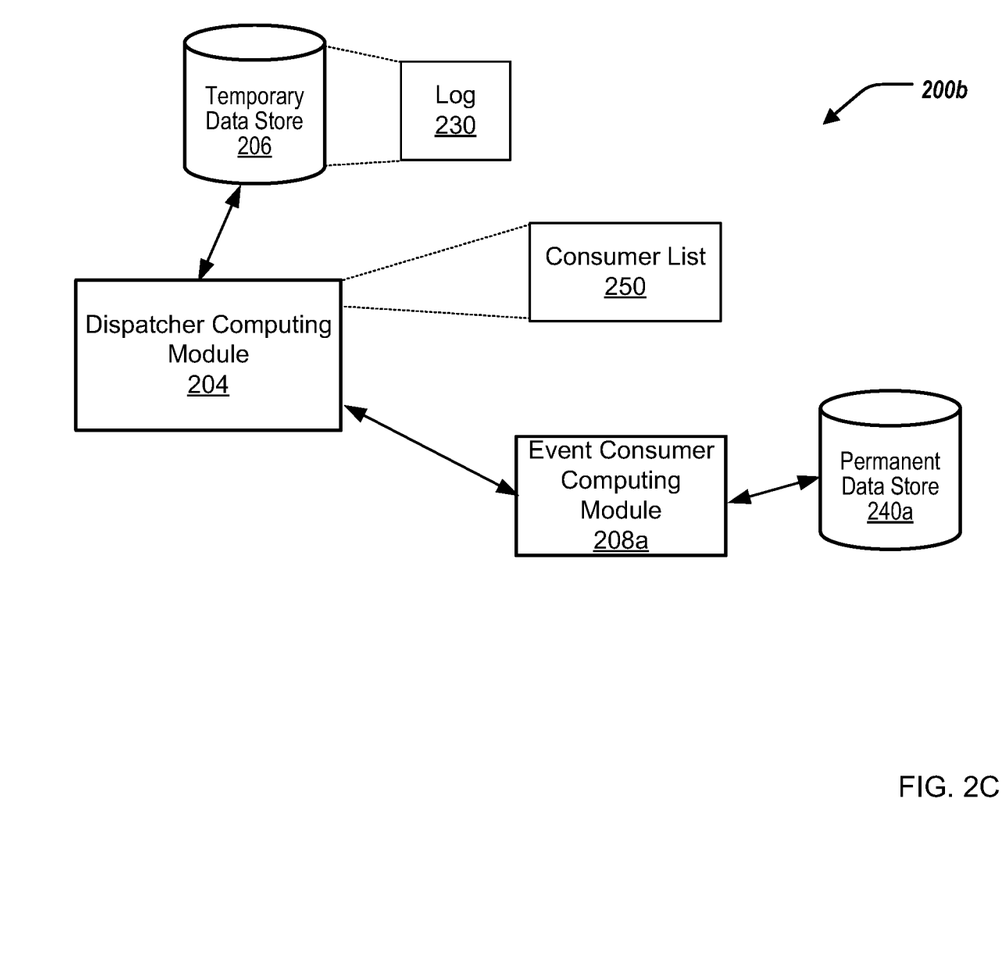
Figure 2D:
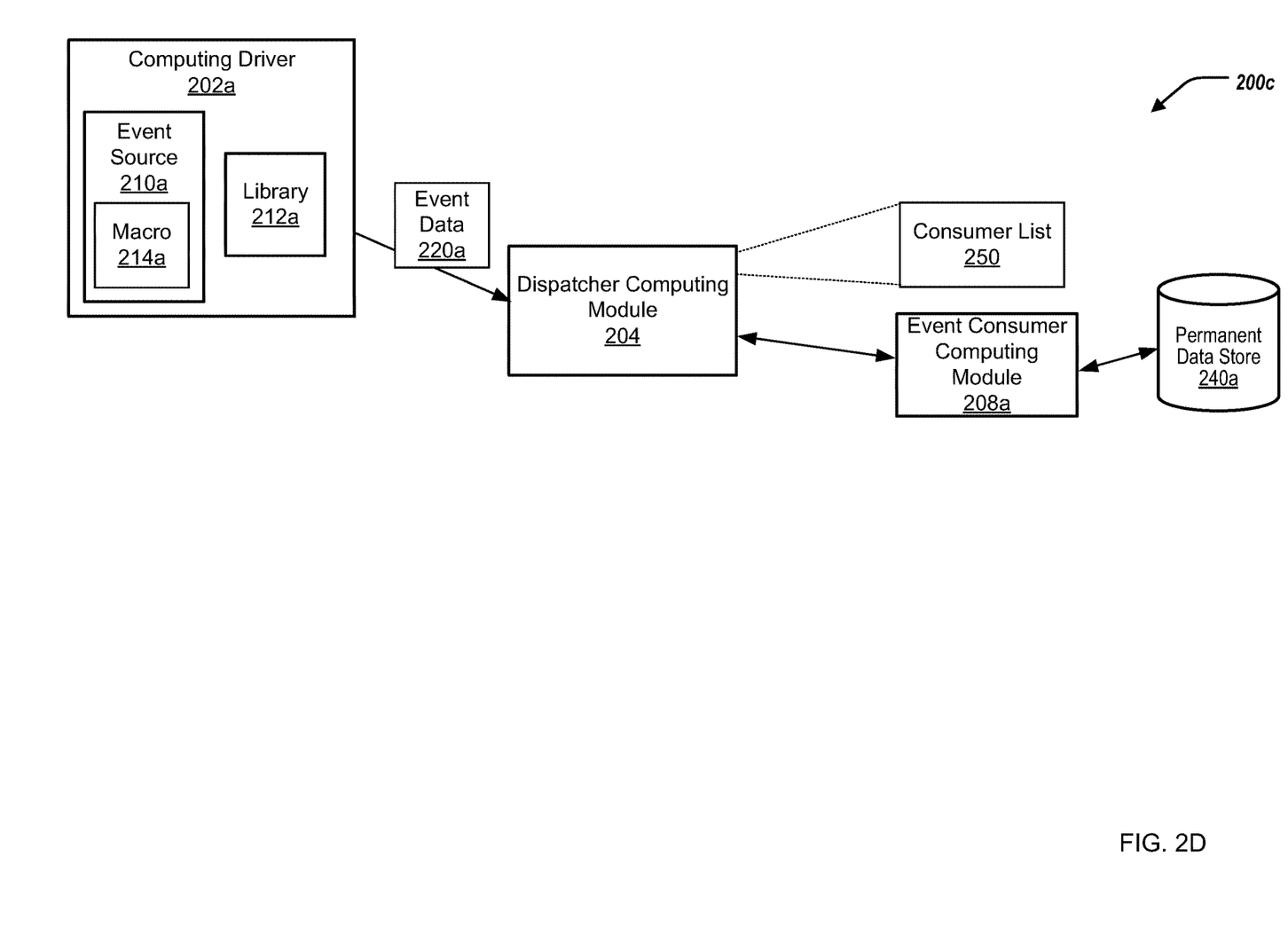
Figure 3:
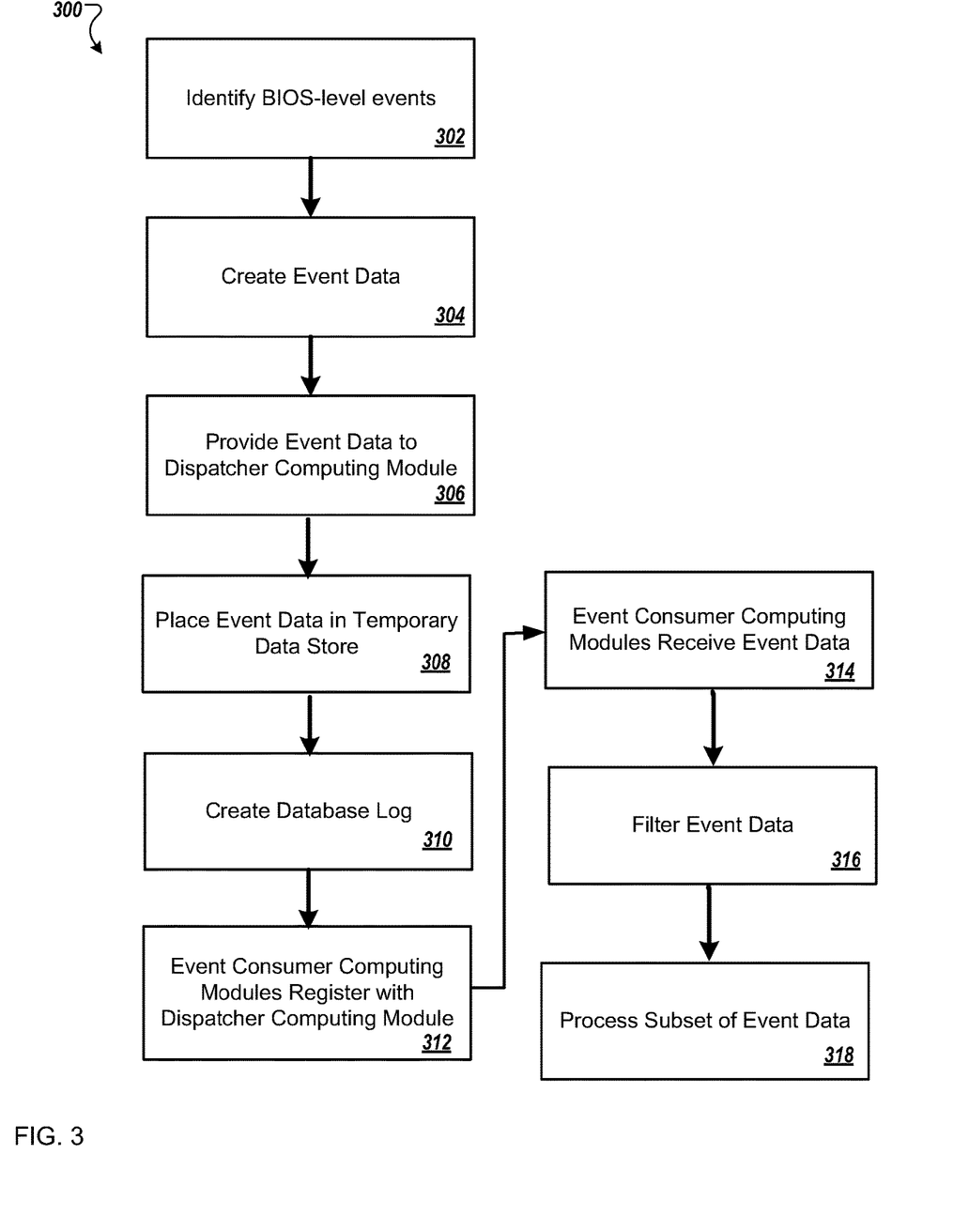
FIG. 3 is a flowchart for consolidated BIOS-level event logging.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning now to FIG. 2A, FIG. 2A illustrates a computing environment 200 that include at least a portion of an information handling system (IHS). The IHS 200 can include a plurality of computing drivers 202a, 202b, . . . , 202n (collectively referred to as drivers 202); however, the environment 200 can include any number of computing drivers 202 depending on the application desired. The environment 200 can further include a dispatcher computing module 204, a temporary data store 206, and a plurality of event consumer computing modules 208a, 208b, . . . , 208n, (collectively referred to as event consumer computing modules 208); however, the environment 200 can include any number of event consumer computing modules 208 depending on the application desired. The drivers 202 can be in communication with the dispatcher computing module 204, and the dispatcher computing module 204 can be in communication with the temporary data store 206 and the event consumer computing modules 208.

The computing driver 202a can include an event source 210a and a library 212a. The event source 210a can include a macro computing module 214a. Similarly, the computing driver 202b can include an event source 210b, and a library 212b, with the event source 210b including a macro computing module 214b. The computing driver 202n can include an event source 210n, a library 212n, and a macro computing module 214n. The event sources 210a, 210b, . . . , 210n can be collectively referred to as event sources 210; the libraries 212a, 212b, . . . , 212n can be collectively referred to as libraries 212; and the macro computing modules 214a, 214b, . . . , 214n can be collectively referred to as macro computing modules 214. Further, the event consumer computing module 208a can be in communication with a permanent data store 240a; the event consumer computing module 208b can be in communication with a permanent data store 240b; and the event consumer computing module 208n can be in communication with a permanent data store 240n. The permanent data stores 240a, 240b, . . . , 240n can be collectively referred to as permanent data stores 240.

During a particular boot of an IHS of the computing environment 200, a plurality of basic input/output system (BIOS)-level events can occur. Specifically, each BIOS-level event can be associated with a different BIOS log event source, e.g., the event sources 210. In some examples, the BIOS-level events can include setup change events such as boot order change events, active boot device change events, secure boot (and related security related settings) change events, BIOS mode change events (e.g., legacy/UEFI; AHCI SATA/RAID), and password change events. In some examples, the BIOS-level events can include diagnostic events such as automatic invocation of diagnostic events, manual invocation of diagnostics events, SMART data change events, and component failure events (as reported by diagnostics). In some examples, the BIOS-level events can include trusted platform module (TPM) measurement change events, firmware update events (successful/unsuccessful), failure to boot events, and boot events (cold/warm/resume).

In some implementations, for each BIOS-level event, the respective computing driver 202 that is associated with the BIOS-level event creates event data for the BIOS-level event. For example, the computing diver 202a, and specifically, the macro computing module 214a, creates the event data 220a; the computing driver 202b, and specifically, the macro computing module 214b, creates the event data 220b; and the computing driver 202n, and specifically, the macro computing module 214n, creates the event data 220n. In particular, the computing drivers 202 can perform functions including accepting logging events from platform BIOS, and BIOS features, including setup and diagnostics; and providing a callback registration facility for the event consumer computing modules 208. The event data 220a, 220b, . . . , 220n can be collectively referred to as event data 220.

To that end, in some examples, each respective computing driver 202 can implement a respective macro computing module 214 and a library 212 to identify event handling protocols for the respective BIOS-level event. Specifically, the macro computing modules 214 can provide consistent data that is in a "common" format. For example, each of the event data 220 can include a respective timestamp, a class of the event data 220 (e.g., a class of the BIOS-level event), and an event identification. The class of the event data 220 can facilitate interpreting and processing of the event data 220 by the event consumer computing modules 208, described further herein. For example, when the BIOS-level event includes a password change event, the respective computing driver 202 and/or macro computing module 214 can identify the class of the password change BIOS-level event. The libraries 212 can automate calls to the respective computing driver 202 and protocols of the same, and automatically locate the protocols on the first occurrence of the BIOS-level event.

In some examples, during the Pre-EFI initialization phase (PEI), the computing driver 202 loads early such that the PEI drivers have the opportunity to log the BIOS-level events from an early boot; the PEI stores the BIOS-level events for handoff to a DXE driver, wherein the PEI storage is limited; and no dispatching of the event data 220 occurs in PEI. During the transition from the PEI phase to a DXE phase, the stored BIOS-level events are handed off to the DXE drivers, which copies the accumulated events from a hand off block (HOB) to a DXE data store. Events occurring in SMM will be communicated to the DXE driver for distribution to the event consumer computing modules 208.

In some implementations, the respective driver computing module 202 associated with the BIOS-level event can call a dispatcher protocol to provide the event data 220 associated with the respective driver computing module 202 to the dispatcher computing module 204. Specifically, the dispatcher computing module 204 can exist for the duration of the boot, and "store-forward" the event data, described further herein. The dispatcher computing module 204 can place each of the event data 220 in the temporary data store 206. For example, the temporary data store 206 can be a buffer and include non-volatile memory such as random-access memory (RAM). In some examples, during the driver execution environment (DXE) phase, the DXE driver loads early via A Priori entry; the DXE driver persists through runtime; and the DXE driver retains an internal store of all events recorded.

In some examples, the dispatcher computing module 204 can record a timestamp of each event data 220. In some examples, the dispatcher computing module 204 does not alter the event data 220. That is, the dispatcher computing module 204 stores each of the event data 220 in the temporary data store 206 without altering, adjusting, or otherwise changing the contents of the event data 220 (e.g., pre-filtering of the event data 220). As described further herein, the event consumer computing modules 208 can "interpret" the "unfiltered" event data 220 as appropriate based on the priorities/parameters of each individual event consumer computing module 208.

In some implementations, the dispatcher computing module 204 can create a database log 230 of the event data. For example, the dispatcher computing module 204 can store the database log 230 in the temporary data store 206. In some examples, the dispatcher computing module 204 can aggregate each of the event data 220 to generate a sequence of events related to the particular boot of the IHS. That is, the dispatcher computing module 204, based on the timestamps of the event data 220 (assigned when the event data 220 is received by the dispatcher computing module 204), can generate the sequence of events for the particular boot of the IHS. That is, for each BIOS-level event that can occur during booting of the IHS 200 can be stored by a single log—the database log 230—and further including a sequence of such BIOS-level events (or chain of the BIOS-level events).

In some implementations, each of the event consumer computing modules 208 can register with the dispatcher computing module 204. That is, each event consumer computing module 208 that can process such event data 220 can register with the dispatcher computing module 204. For example, the event consumer computing module 208 can include a SPI flash logging facilitate event consumer computing module, a storage-based logging facility event consumer computing module, a security health meter event consumer computing module, a diagnostics heuristics event consumer computing module, a telemetry event consumer computing module, and an advanced configuration and power interface (ACPI) event consumer computing module. The event consumer computing modules 208 can register with the dispatcher computing module 204 at any time prior to the BIOS handoff to the OS, and all the events occurring prior to registration will be "played back" to the event consumer computing modules 208, in addition to passing through any new events as they happen, described further herein.

In response to registering, each of the event consumer computing modules 208 can receive each of the event data 220 and the sequence of the events included by the log 230 for the particular boot of the IHS. That is, each of the event consumer computing modules 208 can receive the event data 220 and the sequence of the events from the dispatcher computing module 204 and the temporary data store 206. In particular, all stored event data 220 is dispatched by the dispatcher computing module 204 to each event consumer computing 208 as it registers with the DXE driver. The DXE driver will pass the event data 220 to all registered event consumer computing modules 204 in real-time—all event data 204 will flow through to each of the event consumer computing modules 208 who are currently registered with the dispatcher computing module 204. In other words, the dispatcher computing module 204 can "store and forward" the event data 204—store the event data 220 in the temporary data store 206 and forward the event log 230 to the event consumer computing modules 208. In particular, early PEI events can be "stored and forwarded," passing off to the DXE for processing in the HOB to provide for logging of the event data 220 that occur while hardware resources are limited.

In some examples, each of the event consumer computing modules 208 can receive each of the event data 220 that was previously stored in the temporary data store 206 as well as receiving event data 220 for newly created BIOS-level events that occur after registering with the dispatcher computing module 204. As a result, each of the event consumer computing modules 208 can receive the event data 220 for any BIOS-level event that occurs during booting of the IHS 200—before and after registration of each of the event consumer computing modules 208.

In some implementations, each of the event consumer computing modules 208 can filter the event data 220 to identify a subset of the event data 220 that is applicable to each of the particular event consumer computing modules 208. For example, each of the event consumer computing modules 208 can filter the event data 220 to identify a subset of the event data 220 that the event consumer computing module 208 is able to appropriately process. For example, a particular event consumer computing module 208 can identify a subset of the event data 220 to store in the respective permanent storage 240, while the remaining portion of the event data 220 can act as "transient" data. For example, when the event consumer computing module 208 includes a diagnostics heuristics event consumer computing module or a telemetry event consumer computing module, the respective event consumer computing module 208 can store event data 220 in respective permanent data store 240 that has been appropriately filtered.

In some examples, each of the event consumer computing modules 208 can filter the event data 220 to identify the subset of the event data 220 based on the class of the BIOS-level event. For example, a particular event consumer computing module 208 can identify the respective class of each of the event data 220, and the event data 220 that is associated with a class that matches a class associated with the particular event consumer computing module 208 can be selected for inclusion in the subset of the event data 220. For event data 220 that is of a different class than the class that is associated with the particular event consumer computing module 208, the particular event consumer computing module 208 can "skip" over such event data 220 and not permanently store such data.

In some examples, each of the event consumer computing modules 208 can store the respective subset of event data 220 that is applicable to the respective event consumer computing module 208 in the respective permanent data store 240. For example, the SPI flash logging facility event consumer computing module can store event data 220 in a rolling log and permanently log data about critical events such as a data/time of first occurrence, a date/time of last occurrence, and number of occurrences. For example, a storage-based logging facility event consumer computing module can store all event data 220.

In some implementation, each of the event consumer computing modules 208 can process the respective subset of event data 220 as appropriate.

FIG. 2B illustrates a portion of the environment 200 of FIG. 2A, shown as environment 200a, prior to registration of the event consumer computing modules 208 with the dispatcher computing module 204. As mentioned above, for each BIOS-level event, the computing diver 202a creates the event data 220a. The computing driver module 202 associated with the BIOS-level event can call a dispatcher protocol to provide the event data 220 associated with the respective driver computing module 202 to the dispatcher computing module 204. The dispatcher computing module 204 can place each of the event data 220 in the temporary data store 206. The dispatcher computing module 204 can record a timestamp of the event data 220a. The dispatcher computing module 204 creates the database log 230 of the event data 220a. The dispatcher computing module 204 can further include an event consumer computing module list 250 (or consumer list 250). The consumer list 250 can be a listing (or database) of each of the event consumer computing modules 208 registered with the dispatcher computing module 204. To that end, prior to registration of the event consumer computing modules 208 with the dispatcher computing module 204, the consumer list 250 is empty.

FIG. 2C illustrates a portion of the environment 200 of FIG. 2, shown as environment 200b, for providing event data 220 to the event consumer computing module 208a upon registration—e.g., the event data 220 that was previously stored in the temporary data store 206. Upon registration, the dispatcher computing module 204 can store data indicating the event consumer computing module 208a within the consumer list 250. As mentioned above, in response to registering, the event consumer computing module 208a can receive each of the event data 220 and the sequence of the events included by the log 230 for the particular boot of the IHS. The event consumer computing module 208a can filter the event data 220 to identify a subset of the event data 220 that is applicable to the event consumer computing module 208a. The event consumer computing module 208a can store the respective subset of event data 220 that is applicable to the event consumer computing module 208a in the permanent data store 240a. The event consumer computing module 208a can process the respective subset of event data 220 as appropriate.

FIG. 2D illustrates a portion of the environment 200 of FIG. 2, shown as environment 200c, for providing event data 220 to the event consumer computing module 208a for newly created BIOS-level events that occur after registering with the dispatcher computing module 204. The dispatcher computing module 204 can identify the event consumer computing module 208a via the consumer list 250. For each newly created event that occurs after registering with the dispatcher computing module 204, the event consumer computing module 208a can receive the event data 220. The event consumer computing module 208a can filter the event data 220. The event consumer computing module 208a can store the filtered event data 220 in the permanent data store 240a. The event consumer computing module 208a can process the filtered event data 220 as appropriate.

FIG. 3 illustrates a flowchart depicting selected elements of a method 300 for consolidated BIOS-level event logging method. The method 300 may be performed by the information handling system 100, and/or the computing environment 200, described herein with reference to FIGS. 1, 2A, 2B, 2C, 2D, or another information handling system. It is noted that certain operations described in method 300 may be optional or may be rearranged in different embodiments.

During a particular boot of the IHS, the driver computing module 202 identify a plurality of basic input/output system (BIOS)-level events (302). In some examples, each BIOS-level event is associated with a different BIOS log event source 210. For each BIOS-level event, a respective driver computing module 202 associated with the BIOS-level event creates event data 220 for the BIOS-level event (304). Further, for each BIOS-level event, the respective driver computing module 202 associated with the BIOS-level event calls a dispatcher protocol to provide the event data 220 associated with the respective driver computing module 202 to a dispatcher computing module 204 (306). The dispatcher computing module 204 places each of the event data 220 in a temporary data store 206 (308). In some examples, the dispatcher computing module 204 associates a timestamp with each event data 220, wherein each of the event data 220 is unaltered. The dispatcher computing module 204 creates a database log 230 of the event data 220 (310). In some examples, the dispatcher computing module 204 aggregates each of the event data 220 to generate a sequence of events related to the particular boot of the IHS. Each event consumer computing module 208 registers with the dispatcher computing module 204 (312). In response to the registering, each event consumer computing module 208 receives each of the event data 220 and the sequence of events included by the log 230 (314). Each of the event consumer computing modules 208 filters the event data 220 to identify a subset of event data 220 that is applicable to the particular event consumer computing module 208 (316). Each of the event consumer computing modules 208 processes the respective subset of event data 220 (318).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
identifying, during a particular boot of an information handling system, a plurality of basic input/output system (BIOS)-level events, each BIOS-level event associated with a different BIOS log event source;
for each BIOS-level event:
creating, by a respective driver computing module associated with the BIOS-level event, event data for the BIOS-level event;
calling, by the respective driver computing module associated with the BIOS-level event, a dispatcher protocol to provide the event data associated with the respective driver computing module to a dispatcher computing module;
temporarily storing, by the dispatcher computing module, each of the event data in a temporary data store, including associating a timestamp with each event data, wherein each of the event data is unaltered;
creating, by the dispatcher computing module, a database log of the event data, including aggregating each of the event data to generate a sequence of events related to the particular boot of the IHS;
maintaining a consumer list, the consumer list including a database of each of one or more event consumer computing modules that are registered with the dispatcher computing module, wherein the consumer list is empty prior to registration by the event consumer computing modules;
registering, by one or more of the plurality of event consumer computing modules, with the dispatcher computing module such that the consumer list includes the registered event consumer computing modules;
in response to the registering, receiving, by each of the registered event consumer computing module, each of the event data of the temporary data store that occurred prior to registration of the event consumer computing module and the sequence of events included by the log;
filtering, by each of the registered event consumer computing modules, the event data to identify a subset of event data that is applicable to the particular event consumer computing module;
storing, by each of the registered event consumer computing modules, the event data in a permanent data store from the temporary data store;
identifying, after registration by the one or more plurality of event consumer computing modules, additional BIOS-level events;
identifying, based on the consumer list, one or more of the registered event consumer computing modules;
providing, by the dispatcher computing module, additional event data associated with the additional BIOS-level events to the registered event consumer computing modules identified by the consumer list as the additional BIOS-level events happen;
filtering, by each of the registered event consumer computing modules, the additional event data to identify a subset of the additional event data that is applicable to the particular event consumer computing module;
storing, by each of the registered event consumer computing modules, the subset of the additional event data that occurred after registration of the registered event consumer computing module in the permanent data store independent of storing at the temporary data store; and
processing, by each of the event consumer computing modules, the respective subset of event data.

2. The computer-implemented method of claim 1, wherein each respective driver computing module implements a respective macro and a library to identify event handling protocols for the respective BIOS-level event.

3. The computer-implemented method of claim 1, wherein each of the event data includes the respective timestamp, a class of the BIOS-level event, and an event identification.

4. The computer-implemented method of claim 3, wherein each of the event consumer computing modules filters the event data to identify the subset of events based on the class of the BIOS-level event.

5. The computer-implemented method of claim 1, wherein the BIOS-level events can include a password change event, a boot order change event, a boot device change event, a secure boot change event, a BIOS mode change event, a battery event, a diagnostic event, and a hardware failure event.

6. A system comprising a processor having access to memory media storing instructions executable by the processor to perform operations comprising:
   identifying, during a particular boot of an information handling system, a plurality of basic input/output system (BIOS)-level events, each BIOS-level event associated with a different BIOS log event source;
   for each BIOS-level event:
      creating, by a respective driver computing module associated with the BIOS-level event, event data for the BIOS-level event;
      calling, by the respective driver computing module associated with the BIOS-level event, a dispatcher protocol to provide the event data associated with the respective driver computing module to a dispatcher computing module;
   temporarily storing, by the dispatcher computing module, each of the event data in a temporary data store, including associating a timestamp with each event data, wherein each of the event data is unaltered;
   creating, by the dispatcher computing module, a database log of the event data, including aggregating each of the event data to generate a sequence of events related to the particular boot of the IHS;
   maintaining a consumer list, the consumer list including a database of each of one or more event consumer computing modules that are registered with the dispatcher computing module, wherein the consumer list is empty prior to registration by the event consumer computing modules;
   registering, by one or more of the plurality of event consumer computing modules, with the dispatcher computing module such that the consumer list includes the registered event consumer computing modules;
   in response to the registering, receiving, by each of the registered event consumer computing module, each of the event data of the temporary data store that occurred prior to registration of the event consumer computing module and the sequence of events included by the log;
   filtering, by each of the registered event consumer computing modules, the event data to identify a subset of event data that is applicable to the particular event consumer computing module;
   storing, by each of the registered event consumer computing modules, the event data in a permanent data store from the temporary data store;
   identifying, after registration by the one or more plurality of event consumer computing modules, additional BIOS-level events;
   identifying, based on the consumer list, one or more of the registered event consumer computing modules;
   providing, by the dispatcher computing module, additional event data associated with the additional BIOS-level events to the registered event consumer computing modules identified by the consumer list as the additional BIOS-level events happen;
   filtering, by each of the registered event consumer computing modules, the additional event data to identify a subset of the additional event data that is applicable to the particular event consumer computing module;
   storing, by each of the registered event consumer computing modules, the subset of the additional event data that occurred after registration of the registered event consumer computing module in the permanent data store independent of storing at the temporary data store; and
   processing, by each of the event consumer computing modules, the respective subset of event data.

7. The system of claim 6, wherein each respective driver computing module implements a respective macro and a library to identify event handling protocols for the respective BIOS-level event.

8. The system of claim 6, wherein each of the event data includes the respective timestamp, a class of the BIOS-level event, and an event identification.

9. The system of claim 8, wherein each of the event consumer computing modules filters the event data to identify the subset of events based on the class of the BIOS-level event.

10. The system of claim 6, wherein the BIOS-level events can include a password change event, a boot order change event, a boot device change event, a secure boot change event, a BIOS mode change event, a battery event, a diagnostic event, and a hardware failure event.

11. A non-transitory computer-readable medium storing software comprising instructions executable by one or more computers which, upon such execution, cause the one or more computers to perform operations comprising:
   identifying, during a particular boot of an information handling system, a plurality of basic input/output system (BIOS)-level events, each BIOS-level event associated with a different BIOS log event source;
   for each BIOS-level event:
      creating, by a respective driver computing module associated with the BIOS-level event, event data for the BIOS-level event;
      calling, by the respective driver computing module associated with the BIOS-level event, a dispatcher protocol to provide the event data associated with the respective driver computing module to a dispatcher computing module;
   temporarily storing placing, by the dispatcher computing module, each of the event data in a temporary data store, including associating a timestamp with each event data, wherein each of the event data is unaltered;
   creating, by the dispatcher computing module, a database log of the event data, including aggregating each of the event data to generate a sequence of events related to the particular boot of the IHS;
   maintaining a consumer list, the consumer list including a database of each of one or more event consumer computing modules that are registered with the dispatcher computing module, wherein the consumer list is empty prior to registration by the event consumer computing modules;
   registering, by one or more of the plurality of event consumer computing modules, with the dispatcher computing module such that the consumer list includes the registered event consumer computing modules;

in response to the registering, receiving, by each of the registered event consumer computing module, each of the event data of the temporary data store that occurred prior to registration of the event consumer computing module and the sequence of events included by the log;

filtering, by each of the registered event consumer computing modules, the event data to identify a subset of event data that is applicable to the particular event consumer computing module;

storing, by each of the registered event consumer computing modules, the event data in a permanent data store from the temporary data store;

identifying, after registration by the one or more plurality of event consumer computing modules, additional BIOS-level events;

identifying, based on the consumer list, one or more of the registered event consumer computing modules;

providing, by the dispatcher computing module, additional event data associated with the additional BIOS-level events to the registered event consumer computing modules identified by the consumer list as the additional BIOS-level events happen;

filtering, by each of the registered event consumer computing modules, the event data and the additional event data to identify a subset of the additional event data that is applicable to the particular event consumer computing module;

storing, by each of the registered event consumer computing modules, the subset of the additional event data that occurred after registration of the registered event consumer computing module, in the permanent data store independent of storing at the temporary data store; and processing, by each of the event consumer computing modules, the respective subset of event data.

12. The computer-readable medium of claim 11, wherein each respective driver computing module implements a respective macro and a library to identify event handling protocols for the respective BIOS-level event.

13. The computer-readable medium of claim 11, wherein each of the event data includes the respective timestamp, a class of the BIOS-level event, and an event identification.

14. The computer-readable medium of claim 13, wherein each of the event consumer computing modules filters the event data to identify the subset of events based on the class of the BIOS-level event.

* * * * *